(12) United States Patent
Ruther

(10) Patent No.: US 6,430,827 B2
(45) Date of Patent: Aug. 13, 2002

(54) SPIRIT LEVEL

(76) Inventor: Oskar Ruther, Fährenstrasse 2, CH-9430 St. Margrethen (CH)

( * ) Notice: Subject to any disclaimer, the term of this patent is extended or adjusted under 35 U.S.C. 154(b) by 0 days.

(21) Appl. No.: 09/785,437

(22) Filed: Feb. 20, 2001

(30) Foreign Application Priority Data

Feb. 19, 2000 (CH) .............................................. 00313/00

(51) Int. Cl.⁷ .............................. G01C 9/00; B43L 7/00
(52) U.S. Cl. .............................. 33/451; 33/379; 33/486; 33/666
(58) Field of Search ........................ 33/41.1, 379, 381, 33/382, 451, 484, 485, 486, 666

(56) References Cited

U.S. PATENT DOCUMENTS

| 139,601 | A | * | 6/1873 | Nagle | 33/485 |
| 519,574 | A | * | 5/1894 | Harris | 33/451 |
| 1,653,016 | A | * | 12/1927 | Mellor | 33/485 |
| 1,683,065 | A | * | 9/1928 | Carpenter et al. | 33/382 |
| 2,456,676 | A | * | 12/1948 | Chowns | 33/486 |
| 2,656,609 | A | * | 10/1953 | Siggson | 33/41.1 |
| 5,083,380 | A | * | 1/1992 | Robertson | 33/485 |
| 6,029,362 | A | * | 2/2000 | Miodragovic | 33/666 |
| 6,032,378 | A | * | 3/2000 | Null | 33/451 |
| 6,041,510 | A | * | 3/2000 | Huff | 33/381 |

FOREIGN PATENT DOCUMENTS

| DE | 2754427 A1 | * | 6/1979 |
| DE | 197 49 026 A1 | | 5/1999 |
| FR | 2 602 044 | | 1/1988 |

* cited by examiner

*Primary Examiner*—G. Bradley Bennett
(74) *Attorney, Agent, or Firm*—Peter K. Kontler

(57) ABSTRACT

A spirit level employs an elongated housing having a rectangular cross-sectional outline and provided with registering elongated slots in its front and rear walls. At least one follower of the level has a main portion slidably installed in the housing and one or two pointers outwardly adjacent the slot in the front wall. The two end pieces of the housing are provided with bubble tubes, and each follower has a passage for introduction of a stylus or another suitable marking tool which can be inserted at the front wall to extend outwardly through the slot in the rear wall of the housing.

20 Claims, 2 Drawing Sheets

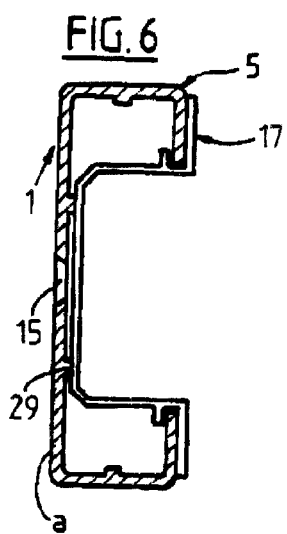
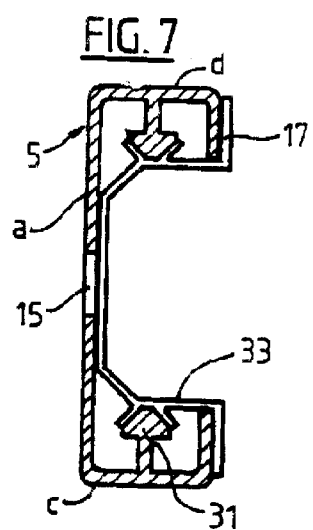
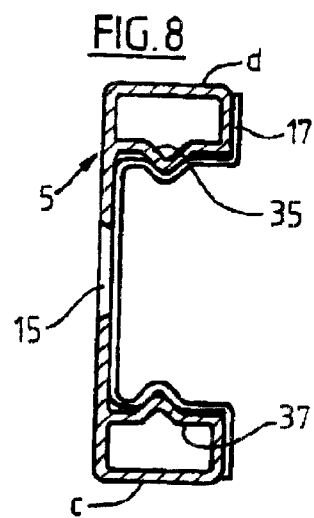
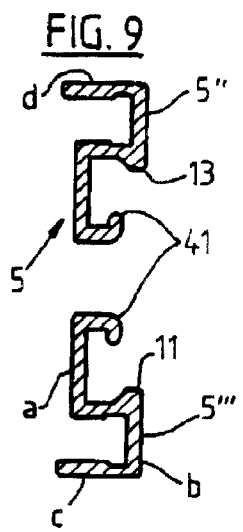
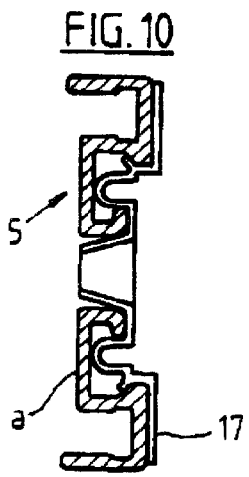
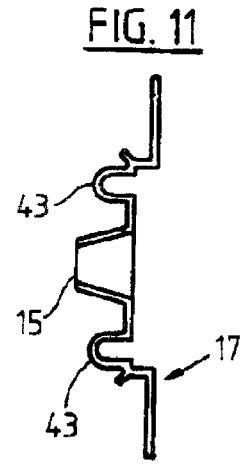
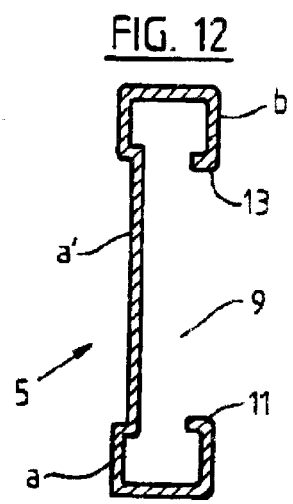

SPIRIT LEVEL

BACKGROUND OF THE INVENTION

The present invention relates to improvements in levels, also called spirit levels, and more particularly to improvements in spirit levels (hereinafter called levels for short) of the type wherein at least one pointer is movable back and forth longitudinally of a housing which carries one or more so-called bubble tubes, and wherein the housing carries a scale which indicates the position of the pointer relative to the housing and hence the orientation of the narrow sidewalls of the housing relative to a horizontal or vertical plane.

As a rule, or in many instances, the housing of a level (such housing can be made of wood, metal or a plastic material) has a polygonal cross-sectional outline and carries one or more bubble tubes which enable the user to ascertain or to select the inclination of a surface or part relative to the horizontal and/or relative to the vertical.

Published French patent application Serial No. 2 602 044 discloses a level wherein the narrow top wall of the housing is provided with a longitudinally extending inverted T-shaped groove slidably receiving portions of two discrete followers. Each follower carries a stylus or another suitable marking tool which extends at right angles to the directions of movement of the respective follower and can be utilized to apply indicia to the surface of a part which is adjacent the top wall of the housing. Clamping devices are provided to individually secure the followers in selected positions relative to the housing of the instrument. The clamping devices have portions engageable by the working end of a screwdriver or another suitable tool which is used to fix the respective pointer in a given position relative to the housing, or to disengage the pointer preparatory Lila to shifting to a different position relative to the housing.

A drawback of the just described proposal is that the followers are located outside of the housing and thus occupy additional space. Moreover, such exposed followers are likely to be damaged or accidentally shifted relative to the housing, and the external groove is likely to gather impurities (e.g., at a construction site and/or in a shop).

Published German patent application Serial No. DE 197 49 026 A1 discloses a level wherein a housing having a polygonal cross-sectional outline carries several followers each of which surrounds three outer sides of the housing. Each follower has at least one pointer and a passage for a stylus at a level above the top wall as well as at a level below the underside of the housing.

A drawback of the just described level (and such drawback is shared by the level disclosed in the afore-discussed French patent application) is that at least one of the followers extends outwardly beyond at least one narrow sidewall of the housing. This interferes with the customary manipulation and utilization of the level. For example, a level of the type disclosed in the afore-discussed published French or German patent application cannot be placed from below against the underside of a ceiling and/or from above against the upper side of a wall or the like. This greatly reduces the versatility and popularity of such levels.

OBJECTS OF THE INVENTION

An object of the present invention is to provide a spirit level which exhibits the advantages but does not embody the drawbacks of the aforediscussed conventional levels.

Another object of the invention is to provide a level which can be manipulated as readily as a standard level but further exhibits advantages, such as convenience of handling, not exhibited by conventional levels.

A further object of the invention is to provide a novel and improved housing for use in the improved level.

An additional object of the instant invention is to provide a novel and improved housing-follower combination for use in the above outlined improved level.

Still another object of this invention is to provide a level wherein the housing as well as each follower can stand pronounced deforming stresses and which can be assembled of simple mass-produced parts at a reasonable cost.

A further object of the invention is to provide a novel and improved method of simplifying the assembly of the housing with the other parts of the improved level.

Another object of the present invention is to provide a level which can be utilized to apply marks to selected portions of pieces of furniture and/or other parts with a high degree of accuracy, which can be readily manipulated by workmen upon a minimum of training, and which can be designed to accept and to accurately locate any selected practical stylus or other marking tool.

An additional object of the invention is to provide a level which can be assembled or taken apart in a simple and time-saving manner.

SUMMARY OF THE INVENTION

The invention is embodied in a spirit level which comprises a housing having at least one wall (such as a relatively wide front wall) provided with an elongated slot, at least one mobile follower which includes a first portion disposed in the housing and a second portion which is outwardly adjacent the wall and is slidable in the slot to move the first portion within the housing, and at least one bubble tube provided in the housing.

It is presently preferred to employ a housing having a polygonal (preferably square and most preferably rectangular) cross-sectional outline.

The first portion of the at least one follower preferably constitutes its major portion.

A second wall of the housing (this second wall is preferably positioned in such a way that it is spaced apart from the at least one wall) can be provided with at least one second slot which is aligned with the elongated slot of the at least one wall. The at least one follower is or can be provided with a passage (such as a bore or a hole) having a first end which is accessible from the outside at the at least one wall, and a second end which is accessible from the outside at the second wall. Such passage can receive a stylus or another marking tool which can be moved by the at least one follower or which can move the at least one follower relative to the housing to a desired position in which the marker is to apply a suitable indicium to a surface of a wall, to a piece of furniture, or the like.

As a rule, the second portion of the at least one follower is provided with one or more pointers which is or which are outwardly adjacent the slot in the at least one wall. The outer side of such at least one wall can be provided with one or more suitably graduated scales to facilitate accurate positioning of one or more pointers relative to the housing and to thus facilitate accurate positioning of the marker or markers relative to the object or surface which is adjacent the second end(s) of the passage(s) defined by the follower.

The at least one wall can be provided with two elongated marginal portions which flank the slot in the at least one wall and serve as guide rails for that part of the second portion of the at least one follower which extends through the elongated slot. Such second portion of the at least one follower can be provided with two pointers each of which is adjacent one of the two marginal portions. At least one such marginal portion can be provided with a scale for the respective pointer of the at least one follower.

If the housing includes a second wall which is spaced apart from and confronts the at least one wall, the first portion of the at least one follower can include at least one extension which abuts and tracks the second wall during movement of the at least one follower relative to the housing. The at least one extension can include one or more ribs which abuts or abut the inner side of the second wall.

The housing can be provided with at least one internal guide which extends longitudinally of the elongated slot, and the first portion of the at least one follower can include at Least one part which tracks the internal guide during movement of the at least one follower relative to the housing. Such housing can further comprise the aforementioned second wall which is spaced apart from and confronts the at least one wall, as well as two spaced-apart sidewalls which connect the at least one wall with the second wall. The at least one internal guide can be provided on one of the sidewalls, and such internal guide can include an elongated rail; the at least one part of the first portion of the at least one follower is or can be arranged to slide along the rail.

The housing can further comprise at least one reinforcing portion which is at least substantially parallel to the at least one slot, and the at least one internal guide can be provided on such reinforcing portion. For example, the reinforcing portion can include a tube which can have a polygonal cross-sectional outline.

It is also possible to assemble the housing of two discrete sections which extend lengthwise of the slot; the at least one internal guide can form part of one of these sections.

For example, the housing can comprise two discrete elongated sections which flank the slot, and two caps or analogous end portions which connect the respective end portions of the two sections to each other. The first end portion of the at least one follower can be provided with at least one corrugated reinforcing portion which is slidably recessed into the external surface of the at least one wall of the housing.

The improved level can comprise a plurality of discrete mobile followers each of which includes a first portion disposed in the housing and a second portion outwardly adjacent the at least one wall and slidable in the elongated slot of such wall to move the first portion of the respective follower within the housing.

Each of the aforementioned cupped or otherwise configurated end pieces of the housing can serve as a receptacle or support for a discrete bubble tube.

The novel features which are considered as characteristic of the invention are set forth in particular in the appended claims. The improved level itself, however, both as to its construction and the modes of assembling and utilizing the same, together with numerous additional important and advantageous features and attributes thereof, will be best understood upon perusal of the following detailed description of certain presently preferred specific embodiments with reference to the accompanying drawings.

BRIEF DESCRIPTION OF THE DRAWINGS

FIG. 6 is a view similar to that of FIG. 2 but showing the housing (in a sectional view) and one follower (in a side elevational view) of a modified level;

FIG. 7 is a similar sectional view of the housing and a side elevational view of one follower forming part of a third level;

FIG. 8 is a similar sectional view of the housing and a side elevational view of one follower forming part of a fourth level;

FIG. 9 is a transverse sectional view of a composite housing forming part of a fifth level;

FIG. 10 shows the structure of FIG. 9 and a modified follower in a side elevational view;

FIG. 11 is a view of the follower of FIG. 10 but with the housing omitted; and FIG. 12 is a transverse sectional view of the housing of a further level.

DESCRIPTION OF PREFERRED EMBODIMENTS

Figure 1:
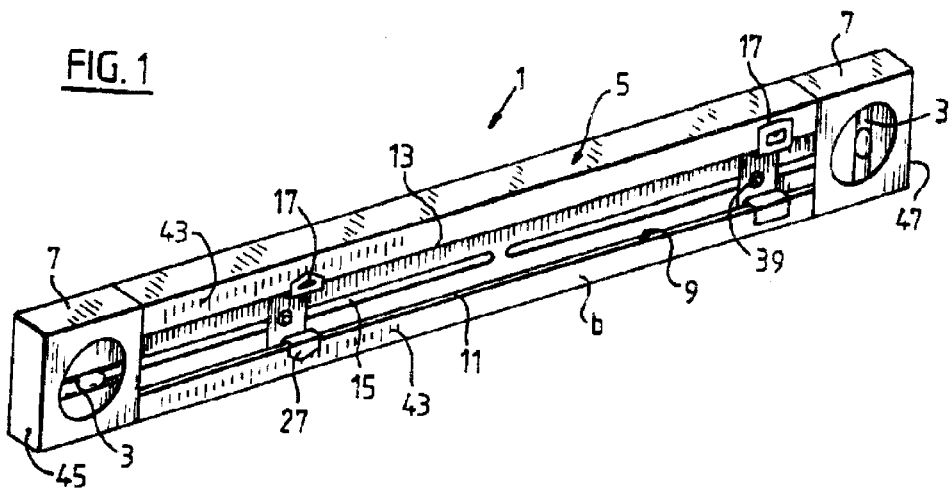
FIG. 1 is a perspective view of a spirit level with two followers and two bubble tubes which embodies one form of the present invention.

FIGS. 1 to 5 illustrate certain relevant details of a level 1 which embodies one form of the present invention. This level comprises an elongated housing 5 having a rectangular cross-sectional outline (see particularly FIGS. 2 and 3) and including a relatively wide (high) first or rear wall b, an identical or similar second or front wall a which confronts and is spaced apart from the wall b, a relatively narrow bottom wall c which extends between the lower edge portions of the walls a and b, a similar (relatively narrow) top wall d which extends between the upper edge portions of the walls a and b, and two cupped end pieces 7 which close the ends of the tubular housing part including the walls a, b, c and d. FIG. 1 shows the level 1 in a position which it normally assumes (or can assume) in actual use.

The left-hand end piece or cap 7 of FIG. 1 is provided with a horizontal first bubble tube 3, and the other end piece 7 is provided with a vertical second bubble tube 3 which can but need not be identical with the first bubble tube. The manner in which the end pieces 7 are (permanently or releasably) form- or force-lockingly connected to (e.g., form-fittingly forced onto or into) the respective ends of the tubular body including the elongated walls a to d forms no part of the present invention.

The rear wall b of the housing 5 is provided with a normally centrally disposed longitudinally extending elongated slot 9 which is flanked by two parallel marginal portions 11, 13 of the wall b. The front wall a of the housing 5 also comprises an elongated one-piece or composite slot 15 which confronts and thus registers with the slot 9 in the rear wall b. The slot 15 which is shown in FIG. 1 consists of two aligned portions which can but need not have identical lengths.

The level of FIG. 1 further comprises two slides or followers 17 which can but need not be identical. Each of the illustrated followers 17 comprises a preferably major first portion (see also FIG. 2) which is confined in the interior of the housing 5 (i.e., within the space defined by the walls a to d and the transverse end portions 45, 47 of the left-hand and right-hand end pieces 7 shown in FIG. 1). This major first portion of each follower 17 comprises at least one reinforcement in the form of an elongated extension or rib 21 (or two or more shorter-extensions) abutting and slidable along the inner side of the wall a.

A second portion of each follower 17 extends outwardly through the slot 9 and is slidably along the marginal portions 11, 13 of the wall b. Each such second follower portion can further include two pointers or fingers 27 each of which is located in front of one of the two marginal portions 11, 13 and is movable along one of two discrete scales 43 provided at the exposed outer side of the rear wall b. The arrangement is preferably such that the second portion of at least one follower 17 is in reasonably pronounced frictional engagement with the marginal portions 11, 13 so that the major portion of the follower 17 can move within the housing 5 only in response to the exertion of a pull or push upon the respective pointer or pointers 27.

Figure 2:
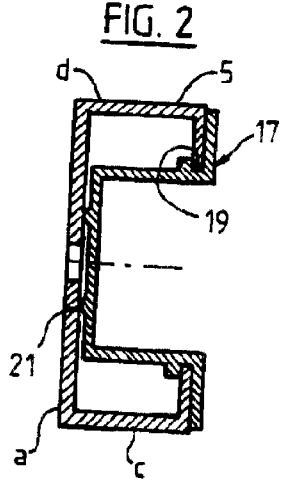
FIG. 2 is an enlarged transverse sectional view of the housing and of one of the followers in the level of FIG. 1.

As can be seen in FIG. 2, those portions of the followers 17 which extend outwardly through the slot 9 are provided with undercut grooves 19 which at least partially receive the respective marginal portions 11, 13 of the rear wall b. At the same time, the extensions 21 of the confined major first portions of the followers 17 abut the inner side of the wall a. The extensions 21 or the grooves 19 can constitute optional but often highly desirable features of the followers 17. These followers can be made of any suitable material; a presently preferred material is a synthetic plastic substance. The dimensions of the followers 17 are or can be selected in such a way that they are maintained in a desirable frictional engagement with the housing 5 but can be readily moved (when necessary) along the slot 9. The material of the housing 5 and/or that of the followers 17 can exhibit a certain amount of elasticity. In fact, the elasticity of the material of the followers 17 can be sufficiently pronounced to render it possible to introduce the major first portion of each follower into the housing 5 through the slot 9, i.e., in a direction from the right to the left as viewed in FIG. 2. Thus, all that is necessary is to move the follower 17 of FIG. 4 in a direction to the left so that its major left-hand portion passes through the slot 9 of the housing 5 shown in FIG. 3 until the marginal portions 11, 13 snap into the respective grooves 19.

Figure 3:
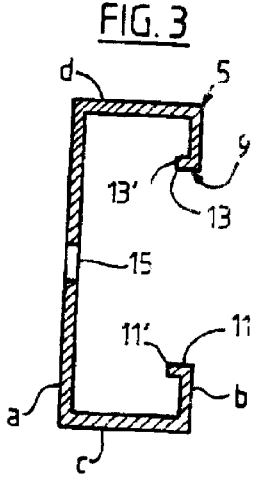
FIG. 3 is a sectional view of the housing of FIG. 2 without the follower.
Figure 4:
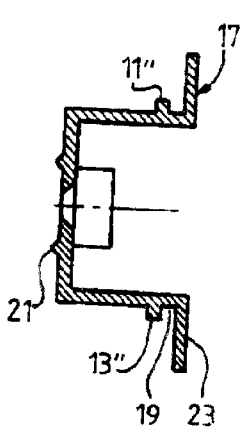
FIG. 4 is a sectional view of the follower of FIG. 2 without the housing.

FIG. 3 shows that the marginal portions 11, 13 of the wall b respectively include inwardly extending reinforcements in the form of strips 11', 13', and FIG. 4 shows that the first portion of the follower 17 shown therein has complementary external reinforcements or strips 11", 13" which snap behind the respective strips 11', 13' when the insertion of the major first portion of the follower 17 into the housing 5 is completed.

Figure 5:
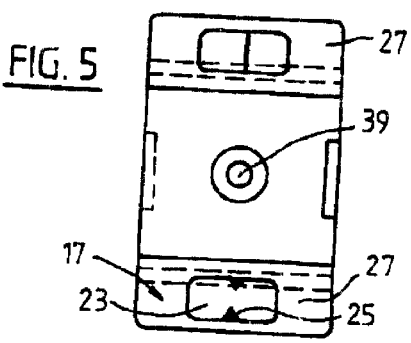
FIG. 5 is a front elevational view of the follower as seen from the right-hand side of FIG. 4.

FIG. 5 shows that each of the pointers 27 is provided with windows 23 which are movable with the respective follower 17 along the adjacent scales 43 and can contain hairs or wires or fingers 25 to further facilitate accurate positioning of the follower relative to the housing 5.

The fingers 25 and windows 23 of FIG. 5 can be omitted if the pointers 27 are shaped (tapered) in a manner as shown in the left-hand portion of FIG. 1. FIG. 1 further shows that the exposed (accessible) smaller second portion of the right-hard follower 17 is identical with that shown in FIG. 5, i.e., different from the one shown in the left-hand portion of FIG. 1.

Each of the followers 17 has a through passage 39 which is open at the outer side of the rear wall b as well as at the outer side of the front wall a. Thus, a stylus, a pencil or another marking tool can be inserted through the passage 39 to apply information to the surface of the object then adjacent the outer side of the wall a as soon as the positioning of the respective follower 17 relative to the adjacent graduated scale 43 is completed. Information with a stylus or the like extending through a passage 39 can also be applied while the respective follower 17 is in the process of moving relative to the housing 5.

The scales 43 can be utilized to select the distance between the passages 39 of the two followers 17, between the passages 39 and the end faces 45, 47 of the neighboring end pieces 7 and/or the distance between the passage 39 of either one of the followers 17 and any other reference point. The aforementioned styli can consist of a metallic material and can be provided with sharp tips to scratch data into the surface of an object abutting or adjacent to the front wall a. Alternatively, the styli can contain ink or other coloring matter; for example, each stylus can constitute or include a pencil.

FIG. 6 shows a portion of a modified level 1 wherein the extensions 29 (such as ribs) are provided at the inner side of the front wall a of the housing 5. The follower 17 of FIG. 6 is or can be identical with the follower of FIG. 4 except that it need not be provided with extensions or ribs 21.

Referring to FIG. 7, there is shown a portion of a level having a housing 5 wherein the sidewalls c and d have inwardly extending guides 31 in the form of rails tracked by complementary female runners 33 forming part of the first portion of the follower 17. The guides 31 stiffen and thus reinforce the housing 5 of FIG. 5 and render it possible to dispense with the parts 11', 13' and 11", 13" shown in FIGS. 3 and 4. It is clear that the guides 31 can be provided on the first portion the follower 17 shown in FIG. 7, and that the parts 33 are then replaced by analogous stationary reinforcing parts at the inner sides of the sidewalls c, d of the housing shown in FIG. 7.

FIG. 8 shows that the sidewalls c, d form part of reinforcements constituting elongated tubular reinforcing members 37 having inwardly extending elongated guides 35 for complementary grooved portions of the follower 17. The reinforcing members need not have a rectangular cross-sectional outline, and they need not be of one piece with the housing 5. Furthermore, such reinforcing members need not-be mirror images of each other.

FIGS. 9, 10 and 11 illustrate certain parts of a further level wherein the housing 5 is assembled of two discrete sections 5", 5''' which are mirror images of each other and the end portions (not shown) of which are held together by end pieces corresponding to the parts 7 shown in FIG. 1. When the sections 5', 5''' are properly coupled to each other, they define an internal space adapted to receive the major first portion of the follower 17 shown in FIGS. 10 and 11. This follower has reinforcing corrugations 43 which are held by snap action in channels provided therefor in the exposed, side of the front wall defined by the respective portions of the sections 5' and 5'''. One of these channels is flanked by the marginal portions 11, 41 of the section 5''', and the other of these channels is flanked by the marginal portions 13, 41 of the section 5".

FIG. 12 illustrates a further housing 5 wherein the front wall a has a centrally located longitudinally extending recess a' to thus provide the wall a with a reinforcing rib having a width matching that of the slot 9 in the rear wall b. The follower which cooperates with the housing 5 of FIG. 12 is or can be similar to the follower 17 of FIG. 4 except that its major portion between the plane of the ribs 21 and the plane of the strips 13", 14" is shorter because the sidewalls of the housing 5 of FIG. 12 are narrower than the sidewalls c, d of the housing shown in FIG. 3.

An important advantage of the improved level is that, owing to the confinement of the major portion of each follower 17 in the interior of the housing 5, at least the major parts of the external surfaces of the walls a, c and d remain unobstructed so that the improved level can be utilized in the same way as any standard level but exhibits numerous additional advantages not offered by conventional levels. The smaller portions (such as those including the pointers 27) of the followers 17 are always accessible at the exposed side of the wall b; this is desirable and advantageous in all or practically all types of levels.

If a stylus is to be driven into an object adjacent the exposed side of the wall a, such operation can be readily carried out by acting upon that (rear) portion of the stylus which is accessible at the exposed side of the wall b.

A further important advantage of the improved level is that the followers 17 and/or the stylus or styli is or are not likely to be damaged even if the manipulation of the improved instrument is entrusted to a person not likely to handle the instrument with utmost care. Thus, the aforediscussed reinforcements to the housing and the aforediscussed reinforcements to and configurations of the followers enable the improved instrument to stand long periods of use under less than ideal circumstances.

The improved level can operate with a single follower 17 or with more than two followers. By the same token, te level can utilize a single bubble tube or more than two bubble tubes.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of spirit levels and, therefore, such adaptations should and are intended to be comprehended within the meaning and range of equivalence of the appended claims.

What is claimed is:

1. A level comprising:
   a housing including at least one wall provided with an elongated slot;
   at least one mobile follower including a first portion disposed in said housing and a second portion outwardly adjacent said wall and slidable in said slot to move said first portion within said housing, at least one of said housing and said at least one follower having at least one reinforcement; and
   at least one bubble tube provided in said housing.

2. The level of claim 1, wherein said housing has a polygonal cross-sectional outline.

3. The level of claim 1, wherein said housing has a square or rectangular cross-sectional outline and said first portion constitutes a major portion of said at least one follower.

4. The level of claim 1, wherein said housing further includes a second wall spaced apart from said at least one wall and having at least one second slot aligned with said elongated slot, said at least one follower having a passage with a first end accessible from without at said at least one wall and a second end accessible from without at said, second wall.

5. The level of claim 1, wherein said second portion of said at least one follower includes a pointer outwardly adjacent said slot.

6. The level of claim 5, wherein said at least one wall has an outer side provided with at least one scale adjacent said slot.

7. The level of claim 1, wherein said at least one wall includes two elongated marginal portions flanking said slot, said second portion of said at least one follower including two pointers each outwardly adjacent and slidable along a different one of said marginal portions.

8. The level of claim 7, wherein at least one of said marginal portions is provided with a scale adjacent the respective pointer.

9. The level of claim 1, wherein said housing further includes a second wall spaced apart from and confronting said at least one wall, said first portion of said at least one follower including at least one extension abutting and tracking said second wall during movement of said at least one follower relative to said housing, said at least one extension forming part of said at least one reinforcement.

10. The level of claim 9, wherein said at least one extension includes a rib abutting said second wall.

11. The level of claim 1, further comprising at least one internal guide provided in said housing, extending longitudinally of said slot and forming part of said at least one reinforcement, said first portion of said at least one follower including at least one part tracking said at least one internal guide during movement of said at least one follower relative to said housing.

12. The level of claim 11, wherein said housing further comprises a second wall spaced apart from and confronting said at least one wall, and two spaced-apart sidewalls connecting said at least one wall with said second wall, said at least one internal guide being provided on one of said sidewalls.

13. The level of claim 12, wherein said at least one internal guide includes an elongated rail and said at least one part of said first portion of said at least one follower is arranged to slide along said rail.

14. The level of claim 11, wherein said housing further comprises at least one reinforcing portion at least substantially parallel to said at least one slot, said at least one internal guide being provided on said at least one reinforcing portion.

15. The level of claim 14, wherein said at least one reinforcing portion includes a tube.

16. The level of claim 11, wherein said housing comprises two discrete sections extending lengthwise of said slot and said at least one internal guide forms part of one of said sections.

17. The level of claim 1, wherein said housing comprises two discrete elongated sections which flank said slot and have first and second end portions, said housing further comprising first and second end pieces respectively connecting the first and second end portions of said sections to each other.

18. The level of claim 17, wherein said at least one reinforcement is provided on said first portion of said at least one follower and includes at least one corrugated reinforcing portion slidably recessed into an external surface of said at least one wall.

19. The level of claim 1, further comprising a second mobile follower including a first portion disposed in said housing and a second portion outwardly adjacent said wall and slidable in said slot to move the respective first portion within said housing.

20. The level of claim 19, wherein said housing further comprises first and second end pieces, said at least one bubble tube being provided in said first end piece and further comprising a second bubble tube provided in said second end piece.

* * * * *